US008307705B2

(12) United States Patent
Ullrich et al.

(10) Patent No.: US 8,307,705 B2
(45) Date of Patent: Nov. 13, 2012

(54) LASER HYDROGRAPHY

(75) Inventors: Andreas Ullrich, Gablitz (AT); Martin Pfennigbauer, Tulln (AT)

(73) Assignee: RIEGL Laser Measurement Systems GmbH, Horn (AT)

( * ) Notice: Subject to any disclaimer, the term of this patent is extended or adjusted under 35 U.S.C. 154(b) by 262 days.

(21) Appl. No.: 12/816,656

(22) Filed: Jun. 16, 2010

(65) Prior Publication Data

US 2011/0271752 A1    Nov. 10, 2011

(30) Foreign Application Priority Data

May 6, 2010 (AT) .................................. A 764/2010

(51) Int. Cl.
*G01F 23/00* (2006.01)
(52) U.S. Cl. .................................. 73/170.29; 356/5.01
(58) Field of Classification Search ........................ None
See application file for complete search history.

(56) References Cited

U.S. PATENT DOCUMENTS

| | | | | | |
|---|---|---|---|---|---|
| 3,719,920 | A | * | 3/1973 | Grada et al. | 367/108 |
| 4,611,313 | A | * | 9/1986 | Ziese | 367/88 |
| 4,754,151 | A | * | 6/1988 | Billard | 250/574 |
| 4,777,630 | A | * | 10/1988 | Burns | 367/87 |
| 5,608,689 | A | * | 3/1997 | Capell, Sr. | 367/87 |
| 5,822,047 | A | * | 10/1998 | Contarino et al. | 356/5.01 |
| 6,836,285 | B1 | | 12/2004 | Lubard et al. | |
| 8,159,388 | B2 | * | 4/2012 | Erkocevic-Pribic et al. | 342/159 |

FOREIGN PATENT DOCUMENTS

AT    WO 03064970 A1    8/2003

OTHER PUBLICATIONS

Guenther G. C., Cunningham A. G., LaRocque P. E., and Reid D. J., "Meeting the Accuracy Challenge in Airborne Lidar Bathymetry," Proceedings of EARSeL—SIG-Workshop LIDAR, Dresden/FRG, Jun. 16-17, 2000.
International Search Report of Dec. 30, 2010 (International Patent Application No. PCT/AT 2010/000221).
Tulldahl et al: "Airborne Laser Depth Sounding: Improvements in Position- and Depth Estimates by Local Corrections for Sea Surface Slope".
Austrian Search Report of Feb. 14, 2011 (Austrian Patent Application No. A 764/2010).
Guenther et al: "Airborne Laser Hydrography, System Design and Performance Factors".
Levin N, "Fundamentals of Remote Sensing".

* cited by examiner

*Primary Examiner* — Lisa Caputo
*Assistant Examiner* — Jermaine Jenkins
(74) *Attorney, Agent, or Firm* — Hoffmann & Baron, LLP

(57) ABSTRACT

Method for laser hydrography in which at least one laser beam is emitted from a known location and in a known direction onto the surface of a body of water and through the water onto the bottom of the body of water and measurement points of the water surface and the water bottom in a coordinate system are determined from transit-time measurements of the reflections of the laser beam at the water surface and water bottom, wherein the local inclination of the water surface at an entry point of the laser beam into the body of water is determined from at least three measurement points of the water surface, wherein a local entry angle of the laser beam into the body of water is determined from the local inclination and the known direction of the laser beam, and wherein the measurement point of the water bottom is created as a function of the laser beam direction, the local inclination, and the optical refraction due to the corresponding local entry angle of the laser beam.

11 Claims, 2 Drawing Sheets

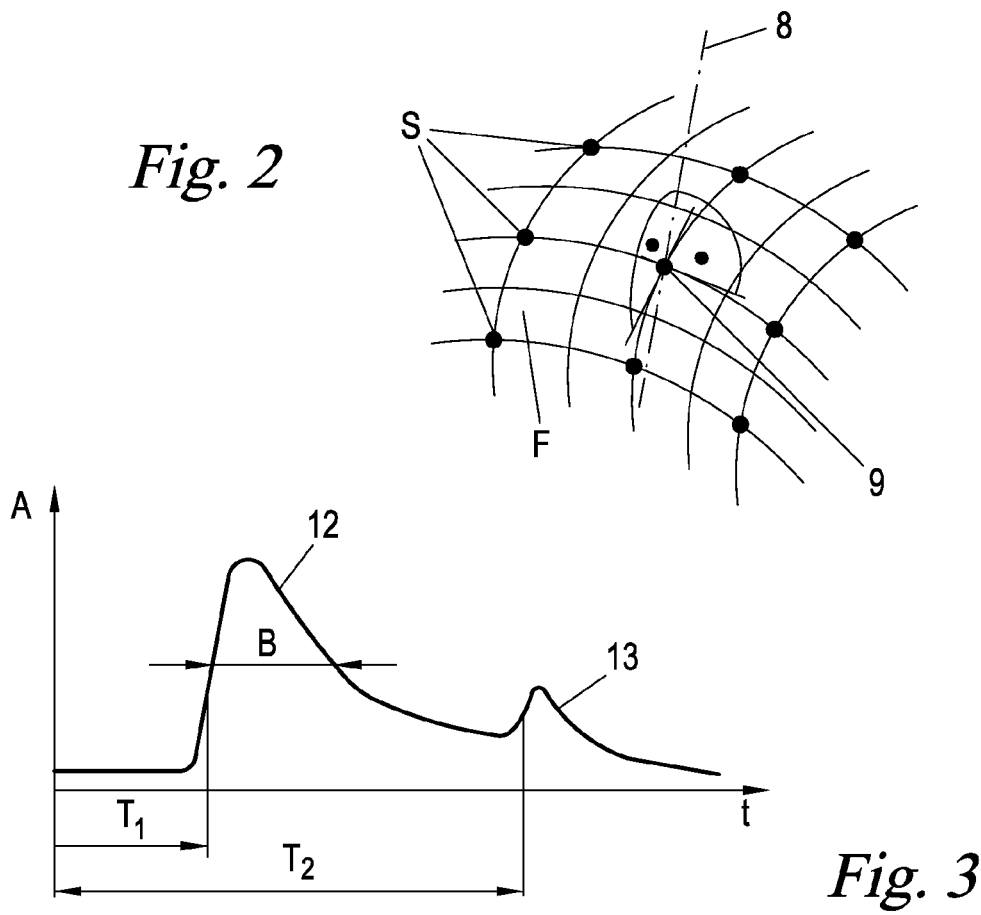
Fig. 2
Fig. 3
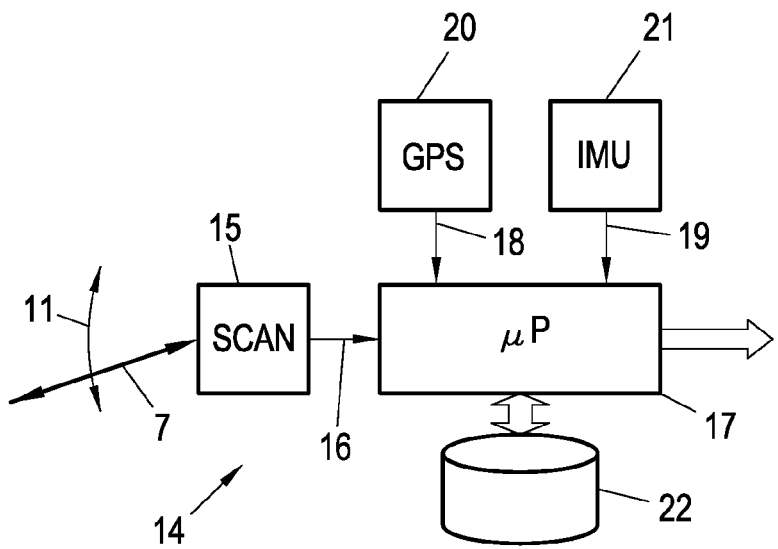
Fig. 4

LASER HYDROGRAPHY

BACKGROUND OF THE INVENTION

The present invention relates to a method for laser hydrography in which at least one laser beam is emitted from a known location and at a known direction onto the surface of a body of water and through the water onto the bottom of the body of water, and measurement points of the water surface and the water bottom in a coordinate system are determined from transit-time measurements of the reflections of the laser beam on the water surface and water bottom.

The surveying of bodies of water by means of laser ranging measurements, so-called laser hydrography or—with a focus on measuring depths—laser bathymetry, is a method that has been established since the 1960s and that is used wherever the water depths are not too large and the water turbidity is not too high, so that reflections of the laser beam on the water bottom can be detected from outside of the body of water. The advantages of laser hydrography relative to underwater sonar or radar methods are the high data capture rate, large surface area coverage, and the possibility of simultaneously detecting areas of land at the edge of the water. A detailed overview of the basic principles and the prior art from the field of laser hydrography is contained in Guenther G. C., Cunningham A. G., LaRocque P. E., and Reid D. J., "Meeting the Accuracy Challange [sic; Challenge] in Airborne Lidar Bathymetry," Proceedings of EARSeL-SIG-Workshop LIDAR, Dresden/FRG, Jun. 16-17, 2000.

All of the known laser hydrography methods work with large laser beam diameters, e.g., in the range of 2-5 m, on the water surface. The water surface can be assumed to be essentially flat and horizontal across such large beam diameters, because the effect of the wave motion of the water averages out across the beam cross section. Such a large laser beam diameter, however, greatly limits the measurement resolution and, indeed, both in the area resolution, i.e., the measurement-point density, and also—due to the averaging—in the time resolution of the transit time measurements and thus the range resolution. The known methods can therefore create only a relatively coarse grid of measurement points of the water surface and the water bottom with low range resolution.

SUMMARY OF THE INVENTION

The invention sets itself the goal of creating a laser hydrography method with higher measurement accuracy and resolution.

This goal is achieved with a laser hydrography method of the type named above that distinguishes itself according to the invention in that the local inclination of the water surface at an entry point of the laser beam into the water is determined from at least three measurement points of the water surface wherein, from this local inclination and the known direction of the laser beam, a local entry angle of the laser beam into the water is determined, and wherein the measurement point of the water bottom is created as a function of the laser beam direction, the local inclination, and the optical refraction due to the corresponding entry angle of the laser beam.

In the method of the invention, the local inclination caused by wave motion in the boundary layer between air and water is taken into consideration for each measurement point of the water bottom. In this way, for the first time tightly focused laser beams with small beam diameters, preferably less than 1 m, especially preferably less than 0.5 m (measured at the water surface), can be used. Therefore, the measurement points can be arranged tightly, and a higher spatial resolution can be achieved. By eliminating the averaging effect, greater accuracy of the range determination of the measurement points can be achieved simultaneously.

Preferably, the entry point of the laser beam is simultaneously a measurement point of the water surface, so that any specified transmission position or angular direction of the laser beam can be used simultaneously for measuring the water surface and the water bottom, which doubles the data capture rate.

In the simplest case, three measurement points of the water surface are sufficient for determining the local inclination, e.g., as a gradient or surface normal of the triangle spanned by the three measurement points. One of the three measurement points can be simultaneously the entry point of the laser beam for the just considered water-bottom measurement point.

A higher accuracy for determining the local inclination can be achieved if, according to a preferred embodiment of the invention, a parametric surface model optimally approximating these measurement points is calculated from several measurement points lying in the vicinity of an entry point, and the local inclination at this entry point is determined from this surface model. In other words, for the use of more than three measurement points, a surface of a pre-selectable function can be adapted by means of a "best-fit" method to these points; the local inclination can then be derived analytically from this surface at the entry point of the laser beam of interest.

According to a first variant of the invention, a laser beam with an infrared and a green light component is used and the reflections of the infrared light component are analyzed for creating the measurement points of the water surface and the reflections of the green light component are analyzed for creating the measurement points of the water bottom. In this way, an outstanding channel separation can be achieved between the two "measurement channels" of the measurement points of the water surface and the water bottom.

An especially preferred second variant of the invention distinguishes itself in that a laser beam with green light is used, both for the creation of the measurement points of the water surface and also for the creation of the measurement points of the water bottom. As is known, green light is best suited for water penetration, while it was previously not used for the partial reflection at the water surface, see, e.g., Guenther et al., loc. cit. The applicants have recognized that with high-quality receiver electronics, even with green light, sufficient reflections can be received back from the water surface, so that, with this embodiment, multi-chromatic reception channels can be eliminated.

Preferably, the laser beam is pulsed and the measurement points are determined from the pulse transit times of the laser pulses reflected from the water surface and from the water bottom. Moreover, for the case of such a pulse transit-time measurement, an estimate of the local entry angle of the laser beam can be calculated from the pulse shape of a laser pulse reflected at the water surface, and the determined local entry angle is validated in comparison with this estimate. This concerns the effect that, for the case of a diffuse reflection on an inclined surface, a spreading or time dilation of the reflected pulse (echo pulse) takes place whose magnitude is approximately proportional to the entry angle. The determined entry angle preferably can be validated against the estimate.

The method of the invention can be used for individual ("point-by-point") measurements, e.g., the water depth. Preferably, however, the laser beam is swept across the water surface in a scanning pattern, in order to simultaneously determine a complete 3D relief (a "3D point cloud") of measurement points of the water bottom.

The method of the invention is especially suitable for so-called airborne laser hydrography (Airborne Laser/Lidar Bathymetry, ALB) in which the laser beam is emitted from an airplane-mounted laser scanner.

BRIEF DESCRIPTION OF THE DRAWINGS

The invention will be explained in detail below using an embodiment with reference to the accompanying drawings in which are shown:

FIG. 2, the principle of adapting a parameterized surface model to a local group of measurement points of the water surface;

FIG. 3, an amplitude/time diagram of the reflections or echo pulses of a laser pulse at the water surface and at the ground at the bottom of the water, and FIG. 4, a block circuit diagram of a laser scanner for carrying out the method of the invention.

DETAILED DESCRIPTION OF THE INVENTION

Figure 1:
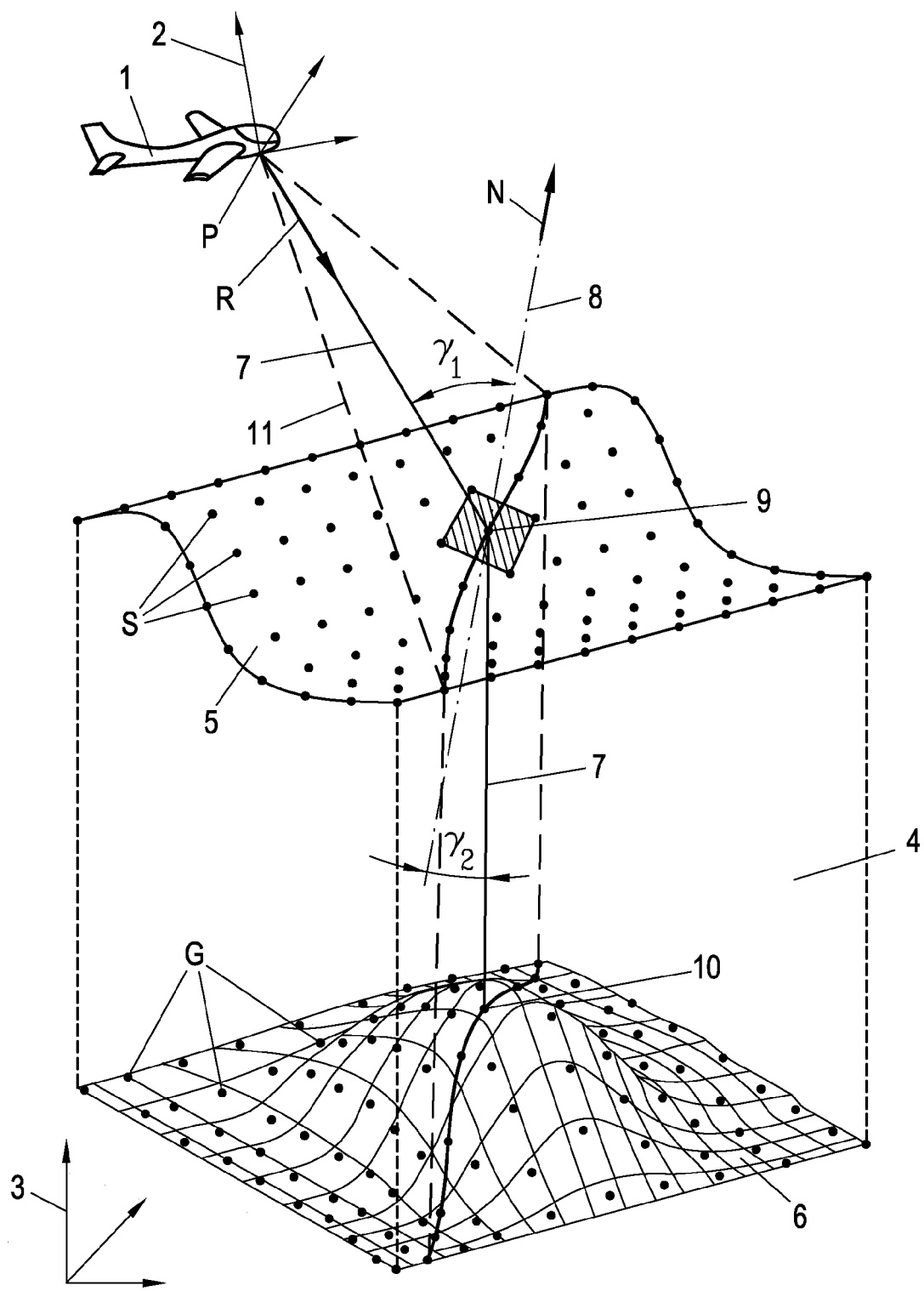
FIG. 1, the method of the invention with reference to an example beam path during the laser scanning of a body of water shown in a perspective section view.

With reference to FIG. 1, the airplane 1 moves with an airplane-specific coordinate system 2 in a world coordinate system 3 over a body of water 4 (shown in section) that is illustrated by its water surface 5 and its water bottom 6. The body of water 4 is, for example, a lake, the course of a river, or the ocean. The water surface 5 is in constant motion due to wind, waves, spray, etc., and the water bottom 6 has irregular surface contours depending on geology, reefs, marine animal and plant life, or artifacts such as wrecks, pipelines, underwater cables, etc. The goal of hydrography or bathymetry is to detect or measure the surface contours (the relief) of the water bottom 6 as true to life as possible in the world coordinate system 3.

For this purpose, a laser beam 7 from airplane 1 is swept across the body of water 4 in a scanning pattern and, indeed, from the current location P of the airplane 1 at a current direction R with respect to the airplane coordinate system 2. If the current position of the airplane 1 is known, i.e., the position of its coordinate system 2 relative to the world coordinate system 3, then the transmission direction R of the laser beam 7 with respect to the world coordinate system 3 can be determined. The direction R can be defined or expressed, e.g., by the azimuth and elevation angle of the laser beam 7 in the airplane coordinate system 2 or world coordinate system 3, as is known in the art.

The laser beam 7 enters into the body of water 4 and is reflected back to the airplane 1 from the water bottom 6 on the same path. At the boundary layer between air and water, the water surface 5, the laser beam 7 is subjected to optical refraction with respect to the surface normal 8 on the water surface 5 at the entry point 9 and, indeed, according to the known law $$\frac{\sin\gamma_1}{\sin\gamma_2} = \frac{n_2}{n_1} \quad (1)$$

where $\gamma_1$=entry angle of the laser beam 7 with respect to the surface normal 8;

$\gamma_2$=exit angle of the laser beam 7 with respect to the surface normal 8;

$n_1$=refractive index of air; and $n_2$=refractive index of water.

From transit-time measurements of the reflections of the laser beam 7 at the water surface 5 and at the water bottom 6, i.e., the partial reflection at the entry point 9 on one hand and at the impact point 10 on the bottom on the other hand, the ranges from the transmission point P to the entry point 9 and to the impact point 10 can be determined if the propagation rates of light in the air and water are known; and the entry and impact points 9, 10 can be located in space in the coordinate system 3 if the transmission direction R and the entry and exit angles $\gamma_1$, $\gamma_2$ are known.

From a plurality of different measurements with the laser beam 7, i.e., sampling or scanning of the water surface 5 and thus also of the water bottom 6, a plurality of entry and impact points 9, 10 can be determined that are consequently designated as measurement points S of the water surface 5 ("Surface") and measurement points G of the water bottom 6 ("Ground"). The measurement points S, G form in their entirety two so-called "point clouds" in space or in the world coordinate system 3, wherein these points represent or map the water surface 5 and the water bottom 6 spatially in this coordinate system. Then, e.g., the local water depth can be calculated from the vertical distances between the water surface 5 and the water bottom 6.

The laser beam 7 is moved back and forth with respect to angle during the sampling (scanning) operation, for example, in a scanning fan 11. In connection with the forward movement of the airplane 1, a line-by-line, surface-covering scanning of the water surface 5 and the underlying water bottom 6 is performed.

For the method known from the prior art, the water surface 5 was assumed to be flat and horizontal—not least of all due to the use of beam cross sections that are large relative to the wavelength of the water waves of the body of water 4—so that the entry angle $\gamma_1$ could be derived directly from the transmission direction R of the laser beam 7.

In contrast, for the method presented here a laser beam 7 is used with a very small beam cross section or beam diameter of, in particular, less than 1 m, preferably less than 0.5 m, measured at the water surface 5. Such a beam diameter is usually smaller than the average wavelength, e.g., of sea waves, which lies in the range of several meters. Thus, the laser beam 7 at the entry point 9 no longer impacts a horizontal surface, but instead a surface with constantly changing local inclination N, e.g., defined as the azimuth and elevation angle of the surface normal 8 in the airplane coordinate system 2 or world coordinate system 3; as directions of two vectors covering the tangential surface at the water surface 5 at the entry point 9; etc. Therefore, the entry angle $\gamma_1$ of the laser beam 7 depends not only on the transmission direction R, but also on the local inclination N at the entry point 9. As a result, this leads to different refractions of the laser beam 7 as a function of the corresponding entry point 9 on the water surface 5, which leads to correspondingly different displacements of the impact points 10 and thus the measurement points G. This effect is compensated as follows.

For each measurement point G, the local inclination N of the water surface 5 at the entry point 9 of the laser beam 7 is determined individually. For this purpose, at least three measurement points S of the water surface 5 adjacent to the entry point 9 are needed (one of the measurement points S could also be the entry point 9 itself). From the surface normal 8 (or the gradient) of the plane spanned by these three measurement points S, the local inclination N in the world coordinate system 3 can be determined directly. From the difference between the local inclination N and the transmission direction R of the laser beam 7, the local entry angle $\gamma_1$ of the laser beam 7 is given. From the entry angle $\gamma_1$, the local optical refraction, i.e., the exit angle $\gamma_2$ of the laser beam 7 at this entry point 9, can be calculated with reference to (1). If the local refraction angles $\gamma_1$, $\gamma_2$ and the ranges determined by means of transit-time measurements from the transmission position P to the entry point 9 and to the impact point 10 are known, the impact point 10 can now be positioned in the world coordinate system 3 as the current measurement point G of the water bottom 6.

For determining the local inclination N, more than three measurement points S of the water surface 5 could also be used, for example, four points as shown in FIG. 1 or nine points as shown in FIG. 2. The more measurement points S used in the vicinity of the entry point 9, the more exact can be the local surface model F of the water surface 5 created in the vicinity of the entry point 9. Such a surface model F is usually a parametric surface mode, for example, a polynomial surface of second, third, or, in general, n-th order, wherein the polynomial coefficients represent the parameters of the surface model F. By looking for the parameters of surface model F that optimally approximate ("best fit") the considered measurement points S, the surface model F optimally approximating the measurement points for the local surface around the entry point 9 can be determined. From the surface model F, the local inclination N at the considered entry point 9 can then be determined analytically, e.g., by forming the gradient.

The transit-time measurements on the laser beam 7 for determining the ranges from the transmission point P to the entry and impact points 9, 10 and thus to the measurement points S, G can be performed in any way known in the art, for example, by interference measurements. For such interference measurements, in any case, a laser beam 7 is used with different light components that are reflected differently by the water surface 5 on one hand and by the water bottom 6 on the other hand, for example, with an infrared component for determining the measurement points S and a green light component for the measurement points G.

Preferably, however, the transit-time measurements are performed by means of a pulsed laser beam 7 with reference to transit-time measurements on the individual pulses of the laser beam 7. FIG. 3 shows an example of the reflected laser pulses (echo pulses) received in the airplane 1 as a reaction to a laser pulse transmitted onto the water surface 5, reflected partially at this surface, and then reflected on the water bottom 6. The emitted laser pulse thus leads to two echo pulses and, indeed, a first echo pulse 12 for the partial reflection at the entry point 9 and a second echo pulse 13 for the reflection at the impact point 10. Thus, with knowledge of the corresponding propagation rates of the light in the water and in the air, the range from point P to the entry point 9 can be determined from the pulse transit time $T_1$ of the first echo pulse 12, and the range from P to the impact point 10 can be determined from the pulse transit time $T_2$ of the second echo pulse 13, as known in the art.

For the use of a pulsed laser beam as shown in FIG. 3, it is not absolutely necessary to use a laser beam 7 with different light components (infrared for the measurement points S and green for the measurement points G). In practical tests it was found that actually a single light component, and, indeed, in particular, a green light component, was also sufficient.

Because in practice the laser beam 7 is not an ideal point-shaped beam even in the method presented here, but instead has a real beam spread on the order of magnitude of up to 1 m on the water surface 5, a spatially expanded laser pulse experiences at impact, i.e., the reflection on an inclined surface, a spreading or time dilation and deformation whose magnitude is dependent on the impact angle. The pulse width B of the first echo pulse 12 is therefore an approximate measure for the entry angle $\gamma_1$ at the entry point 9, wherein this measure can be used, for example, for validating, roughly estimating, or refining the local entry angle $\gamma_1$ determined with the help of the measurement points S or, e.g., also as an iteration starting value for a "best fit" approximation method according to FIG. 2.

FIG. 4 shows an example laser-scanning device 14 that is used for carrying out the mentioned method and that can be carried by the airplane 1. The device 14 comprises a laser scanner 15 of conventional type that changes the laser beam 7 periodically in the scanning fan 11, for example, with the help of a rotating prism mirror. The laser scanner 15 delivers, at its output 16, transit-time or range measurement values of the current measurement points S, G controlled based on the scanner and airplane position. A microprocessor 17 receives these measurement values and combines them in the mentioned way with position data 18 and acceleration data 19 from a satellite navigation receiver 20 and an inertial measurement unit 21 of the airplane 1, in order to position the measurement points S, G delivered from the laser scanner 15 in space or world coordinate system 3 and to store them in a database 22. The microprocessor 17 here carries out the steps named above, in order to position the measurement points G corrected for refraction in the world coordinate system 3.

The invention is not limited to the shown embodiments, but instead comprises all variants and modifications that fall within the scope of the associated claims.

What is claimed is:

1. A method for laser hydrography comprising at least one laser beam emitted from a known location in a known direction onto the surface of a body of water and through the water onto the bottom of the body of water and measurement points of the water surface and the water bottom in a coordinate system are determined from transit-time measurements of reflections of the laser beam at the water surface and water bottom, wherein a local inclination of the water surface at an entry point of the laser beam into the body of water is determined from at least three measurement points of the water surface, wherein a local entry angle of the laser beam into the body of water is determined from the local inclination and the known direction of the laser beam, and wherein the measurement point of the water bottom is determined as a function of the laser beam direction, the local inclination, and the optical refraction due to the corresponding entry angle of the laser beam.

2. The method according to claim 1, wherein the laser beam has a beam diameter of less than 1 m, measured at the water surface.

3. The method according to claim 1, wherein the entry point of the laser beam is simultaneously a measurement point of the water surface.

4. The method according to claim 1, wherein a parametric surface model optimally approximating the measurement points is calculated and the local inclination at the entry point is determined from several measurement points of the water surface lying in the vicinity of the entry point.

5. The method according to claim 1, wherein a laser beam with an infrared and a green light component is used and, wherein the reflections of the infrared light component are analyzed for determining the measurement points of the water surface and the reflections of the green light component are analyzed for determining the measurement points of the water bottom.

6. The method according to claim 1, wherein a laser beam with a green light is used for determining the measurement points of the water surface and also for determining the measurement points of the water bottom.

7. The method according to claim 1, wherein the laser beam is pulsed and the measurement points are determined from the transit times of the laser pulses reflected at the water surface and the water bottom.

8. The method according to claim 7, wherein an estimate of the local entry angle of the laser beam is calculated from the pulse shape of a laser pulse reflected at the water surface, and the determined entry angle is validated against the estimate.

9. The method according to claim 1, wherein the laser beam is swept across the water surface in a scanning pattern.

10. The method according to claim 1, wherein the laser beam is emitted from an airplane-mounted laser scanner.

11. The method according to claim 1, wherein the laser beam has a beam diameter of less than 0.5 m measured at the water surface.

* * * * *